March 24, 1959 J. H. CRUISE ET AL 2,878,792
FUEL FIRING ORGANIZATION AND METHOD
Filed May 27, 1957 3 Sheets-Sheet 1

INVENTORS
John H. Cruise
Henry Schroeder
BY Eldon H. Luther
ATTORNEY

2,878,792
FUEL FIRING ORGANIZATION AND METHOD

John H. Cruise, New York, and Henry Schroeder, Jackson Heights, N.Y., assignors to Combustion Engineering, Inc., New York, N.Y., a corporation of Delaware Application May 27, 1957, Serial No. 661,670

4 Claims. (Cl. 122—478)

This invention has relation to burners of the so-called circular type for projecting a spiralling mass of fuel and air into a furnace lined with heat exchange surface with the mass rotating about the axis of the burner and projecting laterally into the furnace. The invention has particular relation to such a burner organized and a method of firing the same wherein an effective control or regulation of the radiant heat that is imparted to or absorbed by the heat exchange surface in the furnace in the vicinity of the firing zone may be independently regulated for each burner independently of the rate at which fuel is burned and without unduly effecting the combustion process or efficiency.

In accordance with the invention there is provided a burner which includes a cylindrical housing that has its inner end mounted in a suitable opening provided in a vertical wall of a furnace. The furnace is vertically arranged and has heat exchange tubes in side by side relation lining the inner surface of its walls with an opening being provided in the upper end of the furnace through which the combustion gases generated in the furnace pass after passing upwardly through the furnace with these gases being directed over heat exchange surface such as vapor heaters and the like. Fuel and air are conveyed to the cylindrical housing of the burner and projected from the inner end of the housing laterally into the furnace in a spiralling manner so that a spiralling conical mass of intimately mixed fuel and air extend from the burner generally coaxial of this housing into the furnace. The fuel in this spiralling mass is of course ignited and there is sufficient air to support the combustion of this fuel. Formed about the periphery of the inner end of this housing in the wall of the furnace are a plurality of passages extending generally laterally from the periphery of the inner end of the housing. These passages are formed by the tubes lining the inner surface of the furnace wall and they are disposed so as to direct a generally annular stream of diluent gas, such as cooled combustion gases passing from the furnace, about the spiralling mass of fuel and air with this gas being directed toward the axis of the spiralling mass at a location that is a sufficient distance from the end of the burner housing so that it is well beyond the point of stable ignition of the fuel. Separate manifolds are provided to supply the cooled combustion gases to these passages disposed about the upper peripheral portion and about the lower peripheral portion of the inner end of the cylindrical housing independently and valve means are provided in the supply conduits or ducts that lead to these separate manifolds so that the combustion gases introduced above and below the spiralling mass of fuel and air may be independently regulated. With this organization the spiralling mass of fuel and air extending from the burner laterally into the furnace is enveloped by an annular layer of combustion gases which are effective to decrease the surface temperature of the burning mass as well as provide a cool layer thereabout through which radiation must pass with these two factors substantially decreasing the radiation to the heat exchange surface on the furnace walls. By means of the valves that regulate the rate of supply of recirculated combustion gases the quantity of gases that are introduced through the passages surrounding the burner may be regulated thus regulating the radiation to the furnace walls. Furthermore, by independently regulating the recirculated combustion gases introduced armuately above and below the spiralling mass of fuel and air this spiralling mass may be deflected longitudinally of the furnace so as to displace the combustion zone longitudinally of the furnace and accordingly vary the heat absorption of the furnace.

By regulating the radiant heat absorption of the furnace walls in accordance with the invention independently of the firing rate, the heat content in the gases passing through and out of the furnace may be regulated and accordingly the heat input to the heat exchange surface over which the gases are directed, so that in the case of a vapor heater the temperature of the vapor may be regulated.

It is an object of this invention to provide an improved burner organization and method of firing for regulating within limits and independently of the rate of fuel firing the radiant heat absorption in a furnace having heat exchange surface disposed therein.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing wherein—

Figure 1:
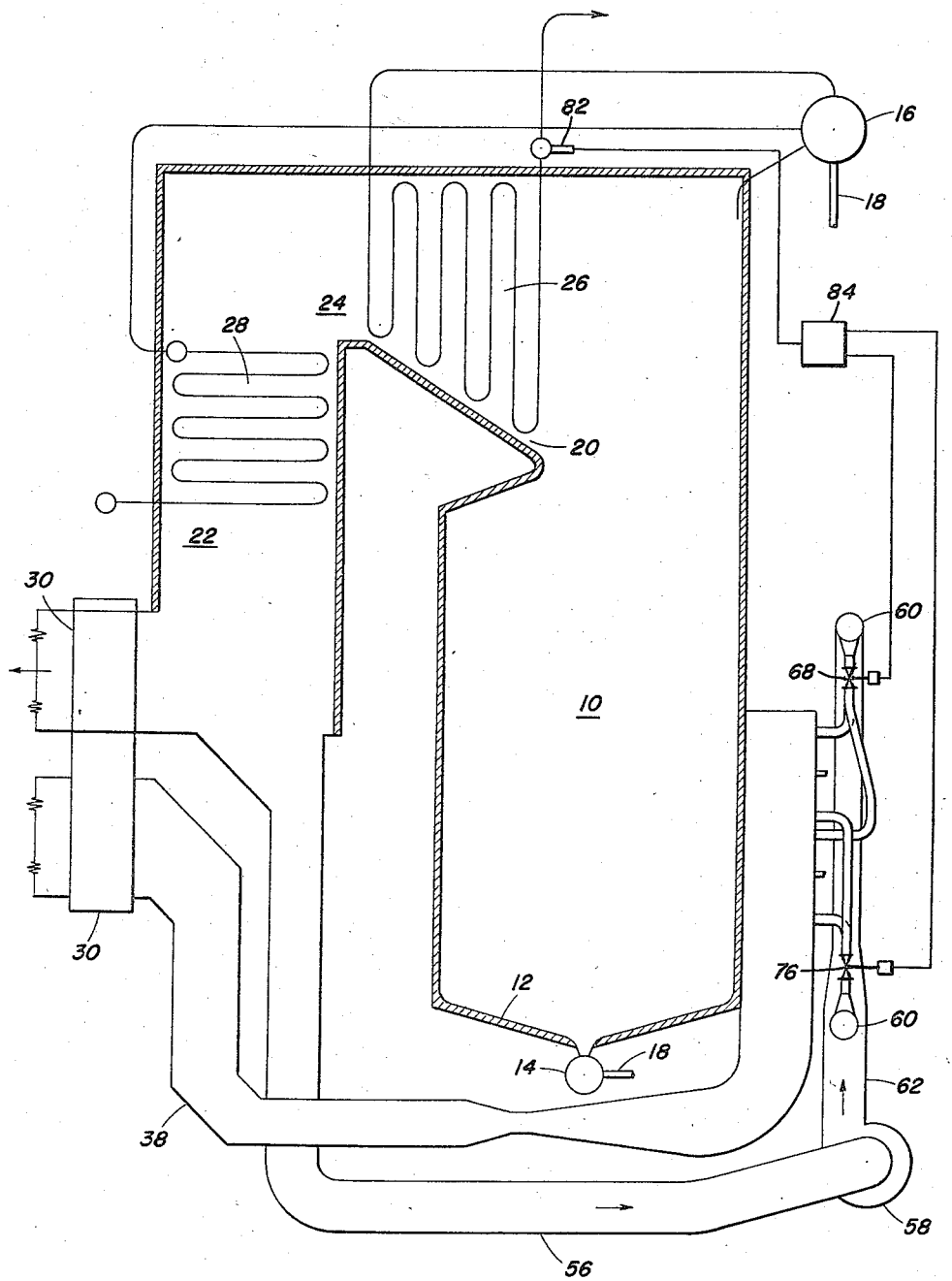
Figure 1 is a vertical sectional view, in the nature of a diagrammatic representation of a steam generator equipped with the present invention.

Referring now to the drawings, wherein like reference characters are used throughout to designate like elements, the illustrative embodiment of the invention disclosed therein includes furnace 10 which is adapted to be fired by a suitable fuel and which has its walls lined with heat exchange tubes 12 that are in tangent side by side relation and are here disclosed as steam generating tubes with the lower end of tubes 12 being connected with supply header 14 and the upper end with the conventional steam and water drum 16. As is usual, header 14 is supplied with water from drum 16 through suitable downcomers 18 with a circulating system thus being established. Combustion gases generated in furnace 10 pass therefrom through the outlet 20 in the upper portion of the furnace with this outlet communicating with the vertically disposed gas pass 22 through horizontal gas pass 24. In the upper portion of furnace 10 and in gas pass 24 is superheater 26 which is connected with drum 16 to receive saturated steam therefrom and heat it to a desired temperature and the water supplied to drum 16 is heated by the economizer 28 positioned in gas pass 22. Thus the combustion gases first pass over superheater 26 and then over economizer 28. These gases are then directed over air heater 30 positioned in the outlet of gas pass 22 and thereafter pass to a suitable stack.

Fuel is introduced into furnace 10 through a front wall burner organization which is herein disclosed as comprised of four separate burners 31. Each of these burners comprises cylindrical housing 32 which has its inner end received within complementary opening 34 provided in the front wall of the furnace and formed by suitably bending and displacing the tubes 12 lining the furnace wall at this location. The housings 32 are positioned in a common wind box 36 which receives hot air from heater 30 through duct 38. The housings 32 are provided with generally tangentially directed vanes 40 which direct the air from wind box 36 tangentially into the housing so that a rapid rotary motion is imparted to it. Axially disposed in housing 32, in the illustrative organization, is the oil supply conduit 42 provided at its end with atomizer 44. With this organization a spiralling conical mass of fuel and air, indicated by the dotted lines 46, is projected from the end of the housing laterally of the furnace 10 and generally coaxial with the housing.

Figure 2:
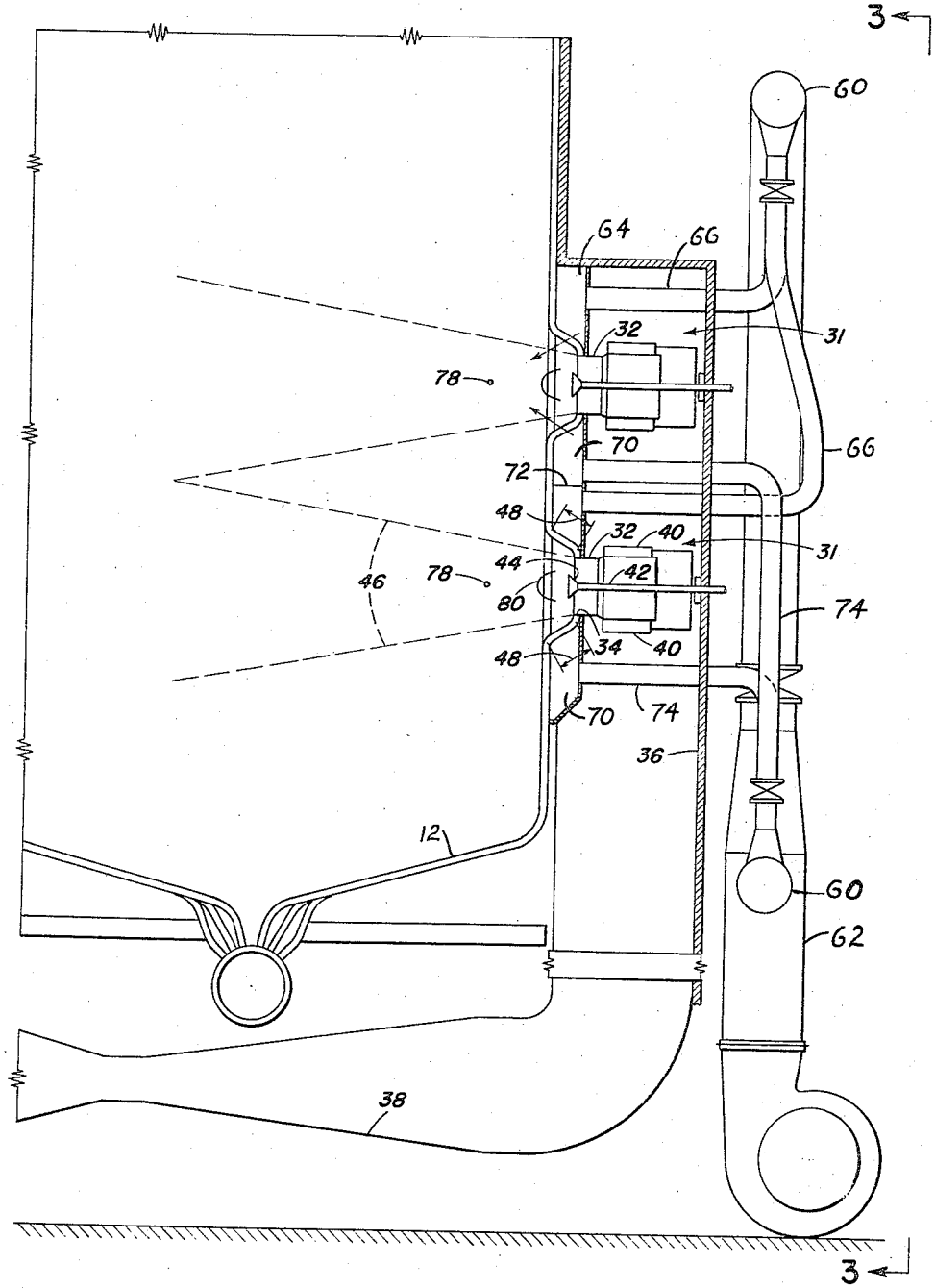
Figure 2 is an enlarged vertical sectional view of a portion of the furnace of Figure 1 showing in detail the construction and mounting of the burner organization of this invention.
Figure 3:
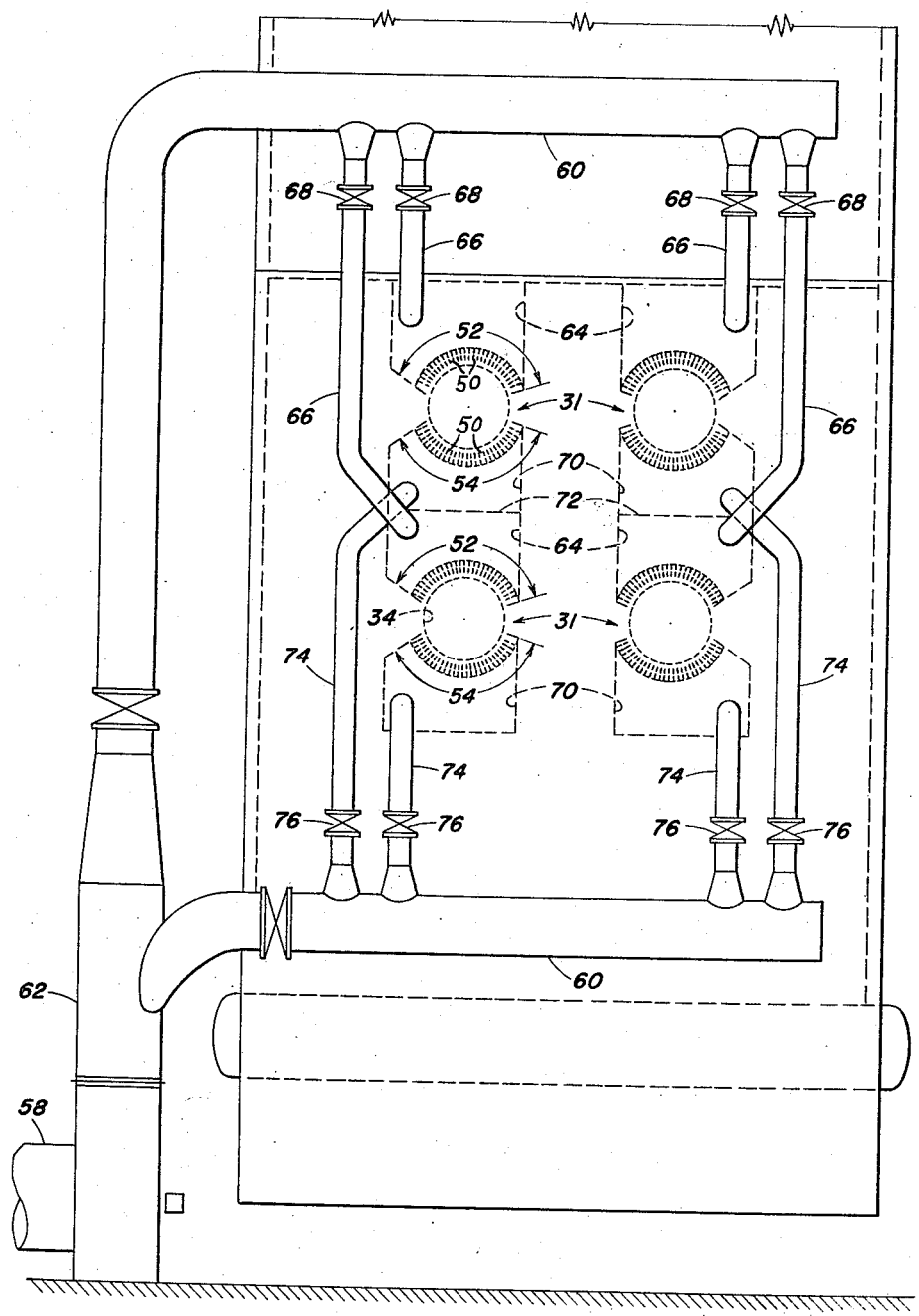
Figure 3 is a front elevational view taken from lines 3—3 of Figure 2 showing the burner organization and the supply ducts therefor.

Passageways are provided about the periphery of the inner end of housing 32 for the purpose of introducing an annular stream of dilutent gas, such as cooled combustion gases generated in the furnace, about the spiralling mass of fuel and air issuing from the housing. These slots are formed by means of tubes 12 which are suitably flattened throughout their length that is designated as 48, in Fig. 2. These tube portions disposed about the periphery of housing 32 are arranged so that the slots or passages, designated as 50 in Fig. 3, are disposed in planes that pass through the axis of the cylindrical housing and there are passages extending throughout the arcuate extent above the housing that is designated 52 and the arcuate extent below the housing that is designated 54 with the lengths of these arcs being such that substantially the entire periphery of the housing is surrounded with slots 50 so that the conical spiralling mass of fuel and air issuing from the housing will be surrounded by the combustion gases.

Combustion gases are supplied through recirculation duct 56 that extends from gas pass 22 to the recirculation fan 58 which in turn delivers these gases at an increased pressure to the supply headers 60. The passages 50 disposed about the upper portion of the periphery of housing 32, or, in other words, the passages 50 throughout the arcuate extent 52, of each burner are separately supplied with combustion gases by a separate manifold 64 which is connected with one of the supply headers 60 through a suitable connecting conduit 66 in which is disposed valve 68 for individually and separately controlling the supply of combustion gases to manifold 64. The passages 50 disposed about the lower portion of the periphery of housing 32, or, in other words, the passages in the arc 54, for each of the burners are also supplied with combustion gases by a separate manifold 70, with the manifolds 64 and 70 positioned between each pair of vertically aligned burners being separated by the wall or plate 72. Combustion gases are supplied to each manifold 70 through a separate supply conduit 74 within which is disposed valve 76 so that the supply of combustion gases to the manifold 70 may be separately and individually controlled.

The tube portions 48 disposed about the periphery of cylindrical housing 32 and which form the slots 50 are arranged so that the combustion gases passing through the slots are directed towards a point such as 78 (Fig. 2) that is generally on the axis of housing 32 but sufficiently removed from the end of the housing so that the combustion gases do not interfere with the ignition of combustion of the fuel but are directed well outwardly of the zone 80 where stable ignition is obtained. While tube portions 48 may be formed to effect this result, if desired, directing vanes may be provided to thus direct the air that passes through passages 50.

As previously mentioned, passages 50 extend throughout substantially the entire periphery of cylindrical housing 32 so that there is formed an annular layer of combustion gases completely about the spiralling fuel and air mass issuing from the housing. This annulus of cooled combustion gases is effective to reduce the surface temperature of this spiralling mass of fuel and air but does not substantially effect the innermost portion thereof. This results in decreasing the radiation to the tubes 18 by both decreasing the surface temperature of the burning mass and also providing a layer of cooled gas through which radiation must pass to reach the furnace wall tubes. While this result is effected the combustion process is not unduly interfered with and a high efficiency is obtained since the inner portion of the burning mass is not substantially affected. By being able to separately regulate the recirculated gases introduced about each burner an individual control of the radiant absorption in the furnace for each burner may be had thereby providing a more accurate and better balanced regulation of this absorption. Furthermore, by being able to separately regulate the combustion gases supplied to the passages 50 above and below the housing 32, respectively through the regulation of the gases supplied to manifolds 64 and 70 the angle of introduction of the spiralling mass from housing 32 into the furnace may be varied within limits, longitudinally of the furnace to longitudinally vary the zone of combustion within the furnace and provide in effect a tilting burner type of control for varying the heat absorption in the furnace. This is brought about by a change on the relative velocity of the introduction of the combustion gases above and below the burner which will result in deflecting the spiralling burning mass. It will, of course, be understood that this control effect will be supplementary to the effect obtained by reducing radiation from the burning mass to the furnace wall through the use of gas recirculation.

While an oil burner organization has been shown, it is to be understood that this is merely for the purpose of illustration since the invention is equally well adapted for other types of burners as for example gas and pulverized coal.

It is thus seen that this burner organization provides for varying the heat absorption in a furnace lined with heat exchange surface independently of the firing rate to thereby vary the heat content in the gases that pass through and from the furnace. The control of the heat content in these gases may be utilized for any purpose desired such as the controlling superheated steam temperature or reheated steam temperature when these gases are directed over the superheater and/or reheat surface. In the illustrative organization of Figure 1 the temperature leaving superheater 26 may be regulated within limits by means of the burner organization and firing method of this invention and automatic controls may be utilized such as element 82 responding to the superheated steam temperature to automatically operated valves 68 and 76 to obtain the right amount of recirculation and the proper location of the zone of combustion to maintain this steam temperature constant with varying load with this element 82 controlling the adjustment of valves 68 and 76 through the control mechanism 84. In such a case the zone of combustion will be moved up and the amount of recirculation increased to obtain a higher steam temperature and the zone of combustion moved down and the gas recirculation decreased to obtain a lower steam temperature. Thus when it is desired to raise the steam temperature a greater total quantity of gases will be recirculated and a greater proportion of these recirculated gases will be directed through the opening in the arc 54 while when a lower steam temperature is desired an opposite control effect is had.

While we have illustrated and described a preferred embodiment of our invention it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of our invention.

What is claimed is:

1. In a burner organization the combination of a furnace which has the inner surface of its walls lined with heat exchange tubes, a plurality of burner housings having their inner ends received within complementary openings in one of said walls and from which end fuel and air are projected into the furnace with said burner housings being laterally spaced from each other, means for effecting such projection of fuel and air from said housing so the mass of fuel and air rotates generally about the axis of the housing, the tubes lining the inner surface of the furnace wall being formed to provide openings in the furnace wall arcuately disposed adjacent to and about substantially the entire periphery of the inner end of said housing with the openings being disposed so as to direct streams of gas therethrough toward the axis of the fuel and air stream projecting from the burner housing at a point a substantial distance from the end of the housing, means for supplying a high pressure gas independently to the openings disposed about each burner housing and independently to the openings disposed about substantial but diametrically opposed arcuate portions of the periphery of the inner end of each housing and means operative to independently control the delivery of said gas to the diametrically opposed arcuate group of passages of each burner housing.

2. A wall burner organization comprising in combination a vertical furnace wall having tubes lining the inner surface thereof, a cylindrical burner housing having its inner end received within a complementary opening in said wall and from which fuel and air are projected into the furnace, means for effecting such projection of fuel and air from said housing so that the mass of fuel and air rotates generally about the axis of the housing, the tubes lining the furnace wall being formed to provide openings in the furnace wall adjacent about the periphery of the inner end of the burner with the openings extending laterally outwardly from said periphery and disposed to direct a gas toward the axis of the fuel and air stream projecting from the burning housing at a point a substantial distance from the end of the housing, a distributing manifold from which the openings disposed about the upper half of the periphery of the housing lead, another and separate manifold from which the openings disposed about the lower half of the periphery of the housing lead, separate means for directing a high pressure gas to each of these manifolds, said separate means including valves for independently controlling the delivery of said gas to said manifolds.

3. In the firing of a vertically disposed furnace having heat exchange surface in the vicinity of the firing zone and disposed thereabout and in which furnace the combustion gases generated therein pass longitudinally thereof toward the outlet of the furnace and traverse a vapor heater, the method of regulating within limits the radiant heat absorption of said heat exchange surface and accordingly the heat input to the vapor heater independently of the rate at which fuel is burned in the furnace comprising introducing fuel together with the air necessary to support combustion thereof in an intermingled conical spiralling mass with the axis of the conical spiralling mass and accordingly the projection of the fuel and air being generaly lateral of the furnace, introducing a cool dilutent in a generally annular stream about the periphery of the conical spiralling mass and directed toward a point on the axis of the conical mass well beyond the point where stable ignition of the mass is had and enveloping the conical spiralling mass with said cooled gas thereby decreasing the radiation to the heat exchange surface without substantially affecting combustion efficiency, regulating this introduction of cooled gas to regulate the radiation to the heat exchange surface with an increase in flow of cooled gas decreasing such radiation and a decrease in flow increasing such radiation, and independently regulating the velocity of introduction of cooled gas introduced generally on the side of the spiralling mass toward the furnace outlet relative that introduced on the side of the spiralling mass remote from the furnace outlet in order to deflect the cone as desired longitudinally of the furnace toward and away from the outlet.

4. In the firing of a furnace having heat exchange surface in the vicinity of the firing zone and disposed thereabout and in which furnace the combustion gases generated therein pass longitudinally thereof toward the outlet of the furnace and traverse a vapor heater, the method of regulating within limits the radiant heat absorption of said heat exchange surface independently of the rate at which the fuel is burned in the furnace comprising introducing fuel together with the air necessary to support combustion thereof in an intermingled conical spiralling mass with the axis of the conical spiralling mass and accordingly the projection of the fuel and air being generally lateral of the furnace, introducing cool combustion gas in a generally annular stream about the periphery of the conical spiralling mass and directed toward a point on the axis of the conical mass well beyond the point where suitable ignition of the mass is had and enveloping the conical spiralling mass with said cooled combustion gas thereby decreasing the radiation of the heat exchange surface without substantially effecting combustion efficiency, independently regulating the velocity of the cooled gas introduced above the spiralling mass relative to that introduced below the spiralling mass in order to deflect the cone longitudinally of the furnace, decreasing the radiant heat absorption of the furnace by increasing the amount of gases recirculated and increasing the velocity of gases introduced below the spiralling mass relative to that above the spiralling mass to deflect the zone of combustion upward, and increasing the radiant absorption of the furnace by decreasing the amount of gases recirculated and increasing the velocity of gases introduced above the spiralling mass relative to that introduced below the spiralling mass to deflect the zone of combustion downward.

References Cited in the file of this patent

UNITED STATES PATENTS

| 2,224,544 | Keller | Dec. 10, 1940 |

FOREIGN PATENTS

| 1,068,954 | France | Feb. 10, 1954 |